United States Patent
Zhang et al.

(10) Patent No.: US 8,311,134 B2
(45) Date of Patent: Nov. 13, 2012

(54) METHOD FOR TRANSMITTING SCATTERED PILOT SIGNALS IN MULTI-CARRIER SYSTEM

(75) Inventors: Hui Zhang, Beijing (CN); Liangchuan Kang, Beijing (CN); Fei Meng, Beijing (CN); Jiongliang Li, Beijing (CN)

(73) Assignee: Innofidei Inc., Beijing (CN)

( * ) Notice: Subject to any disclaimer, the term of this patent is extended or adjusted under 35 U.S.C. 154(b) by 1091 days.

(21) Appl. No.: 12/145,740

(22) Filed: Jun. 25, 2008

(65) Prior Publication Data

US 2008/0317147 A1 Dec. 25, 2008

(30) Foreign Application Priority Data

Jun. 25, 2007 (CN) .......................... 2007 1 0117837

(51) Int. Cl.
*H04K 1/10* (2006.01)
(52) U.S. Cl. ..................................... 375/260; 375/259
(58) Field of Classification Search .................... 375/260
See application file for complete search history.

(56) References Cited

U.S. PATENT DOCUMENTS

| | | | | |
|---|---|---|---|---|
| 7,388,847 B2 * | 6/2008 | Dubuc et al. | ................. | 370/329 |
| 7,460,506 B2 * | 12/2008 | Ro et al. | ........................ | 370/335 |
| 7,808,885 B2 * | 10/2010 | Akita et al. | ................... | 370/208 |
| 7,940,867 B1 * | 5/2011 | Wasily | .......................... | 375/343 |
| 2005/0265293 A1 * | 12/2005 | Ro et al. | ........................ | 370/335 |
| 2006/0109780 A1 * | 5/2006 | Fechtel | .......................... | 370/203 |
| 2007/0165514 A1 * | 7/2007 | Akita | ............................ | 370/208 |
| 2007/0253321 A1 * | 11/2007 | Akita et al. | ................... | 370/208 |
| 2008/0253279 A1 * | 10/2008 | Ma et al. | ....................... | 370/206 |
| 2009/0154540 A1 * | 6/2009 | Yu et al. | ........................ | 375/227 |
| 2010/0020890 A1 * | 1/2010 | Choi et al. | .................... | 375/260 |

FOREIGN PATENT DOCUMENTS

WO    WO 2005/088882    9/2005

* cited by examiner

*Primary Examiner* — David Ometz
*Assistant Examiner* — Santiago Garcia
(74) *Attorney, Agent, or Firm* — Pearl Cohen Zedek Latzer, LLP

(57) ABSTRACT

A method for transmitting scattered pilot signals in a multi-carrier system is disclosed. The method includes: in each time slot, in time dimension, putting each 4 OFDM symbols into a group according to the order of the OFDM symbols; in each group of OFDM symbols, in frequency dimension, selecting, for each OFDM symbol, a plurality of valid sub-carriers to transmit scattered pilots, wherein for a same OFDM symbol, between each 2 valid sub-carriers selected, there are 7 valid sub-carriers; for different OFDM symbols in a same group, the valid sub-carriers selected are interleaving in frequency domain; and transmitting scattered pilot signals on the valid sub-carriers selected. The solution helps the multi-carrier system to handle multi-path channel with large delay spread, to obtain more accurate channel estimation and to achieve better receiving performance.

2 Claims, 2 Drawing Sheets

▨ Continuous pilot   ■ Scattered pilot   ☐ Data

METHOD FOR TRANSMITTING SCATTERED PILOT SIGNALS IN MULTI-CARRIER SYSTEM

CROSS REFERENCE TO RELATED APPLICATIONS

This application claims the benefit of Chinese Patent Application No. 200710117837.4, filed on Jun. 25, 2007, which is incorporated in its entirety herein by reference.

FIELD OF THE INVENTION

The present invention relates to mobile multimedia broadcast technique, and particularly to a method for transmitting scattered pilot signals in a multi-carrier system.

BACKGROUND OF THE INVENTION

Channel describes all media through which a signal is transmitted from a transmitter to a receiver. The media include physical media, such as cable channel, optical channel and wireless channel. The wireless channel is random in many aspects and may produce signal magnitude, phase and frequency distortion and intersymbol interference which are great challenges to the design of the receiver. Therefore, wireless channel estimation and prediction are needed. In theory studies, a channel model statistic method is introduced to describe the influence that a channel has on signals. A channel model is built based on the attributes of signals in certain environment.

Channel estimation can be defined as the qualitative analysis of the influence that a physical channel has on an input signal, and is the mathematical expression of the influence that the channel has on the input signal. "Good" channel estimation indicates an estimation algorithm that minimum estimation errors. Channel estimation can be roughly divided into non-blind channel estimation, blind channel estimation and semi-blind channel estimation. In the non-blind channel estimation, pilots are adopted to obtain the information of channel at the pilot positions, and the information of the channel for transmission of all data will be obtained based on the information of the channel at the pilot positions. In the blind channel estimation, channel estimation is obtained by using a corresponding information processing technique and no pilot is needed. Compared with conventional non-blind channel estimation technique, the blind channel estimation technique significantly improves the transmission efficiency of the system. However, the convergence speed of the blind channel estimation algorithm is usually low, which hinders the application of the blind channel estimation technique in practical systems. The semi-blind channel estimation technique finds a middle way between data transmission efficiency and convergence speed, i.e., a way to obtain the information of the channel at all times with comparatively less training sequences.

SUMMARY OF THE INVENTION

An embodiment of the present invention discloses a method for transmitting scattered pilot signals in a multi-carrier system to improve the accuracy of channel estimation.

In the method for transmitting scattered pilot signals in a multi-carrier system, a transmitter in the multi-carrier system inserts scattered pilots into valid sub-carriers of every OFDM symbol. The method includes:

(a) in each time slot, in time dimension, putting each 4 OFDM symbols into a group according to the order of the OFDM symbols;

(b) in each group of OFDM symbols, in frequency dimension, selecting, for each OFDM symbol, a plurality of valid sub-carriers to transmit scattered pilots, wherein for a same OFDM symbol, between each 2 valid sub-carriers selected, there are 7 valid sub-carriers; for different OFDM symbols in a same group, the valid sub-carriers selected are interleaving in frequency domain; and (c) transmitting scattered pilot signals on the valid sub-carriers selected.

Another embodiment of the present invention discloses a computer program executing the method and a computer program product including the computer program in its computer readable medium.

The method for transmitting scattered pilot signals in the multi-carrier system disclosed by the embodiment of the present invention helps the system to handle multi-path channel with large delay spread, to obtain more accurate channel estimation and to achieve better receiving performance.

DETAILED DESCRIPTION OF THE INVENTION

Orthogonal Frequency Division Multiplexing (OFDM) is a multi-carrier technology. The new generation of the OFDM-based wireless communication system is sensitive to frequency offset, and coherent detection is usually adopted. The data transmission rate is high, coherent detection is needed to achieve high performance, and therefore the non-blind channel estimation technique is usually adopted to obtain better result and to help track the variation of wireless channels better and to improve the performance of the receiver.

The non-blind channel estimation algorithm for pilot-based OFDM channel estimation basically includes that a plurality of pilots are inserted at appropriate positions by the transmitter, and information of the channel at the pilot position is recovered by the receiver based on the pilot, and then the information of channel at all time is obtained by using a processing method, such as interpolation, filter and transform.

The selection and insertion of the pilot are the basis of the pilot-based channel estimation.

In the OFDM system, a pilot signal has both time and frequency dimensions. Continuous pilots and scattered pilots are inserted to improve the estimation accuracy, and the number of pilots is a compromise between estimation accuracy and system complexity. The intervals between the pilots are limited by the coherent time and coherent bandwidth of the channel. In time domain, the interval between two pilots should be shorter than the coherent time. In frequency domain, the interval between two pilots should be narrower than the coherent bandwidth. The most common network design of mobile multimedia broadcast system is single-frequency network. In the single-frequency network, a multi-path transmission environment is established at the receiver, and a plurality of transmitters in the scheme brings greater delay spread.

Figure 1:
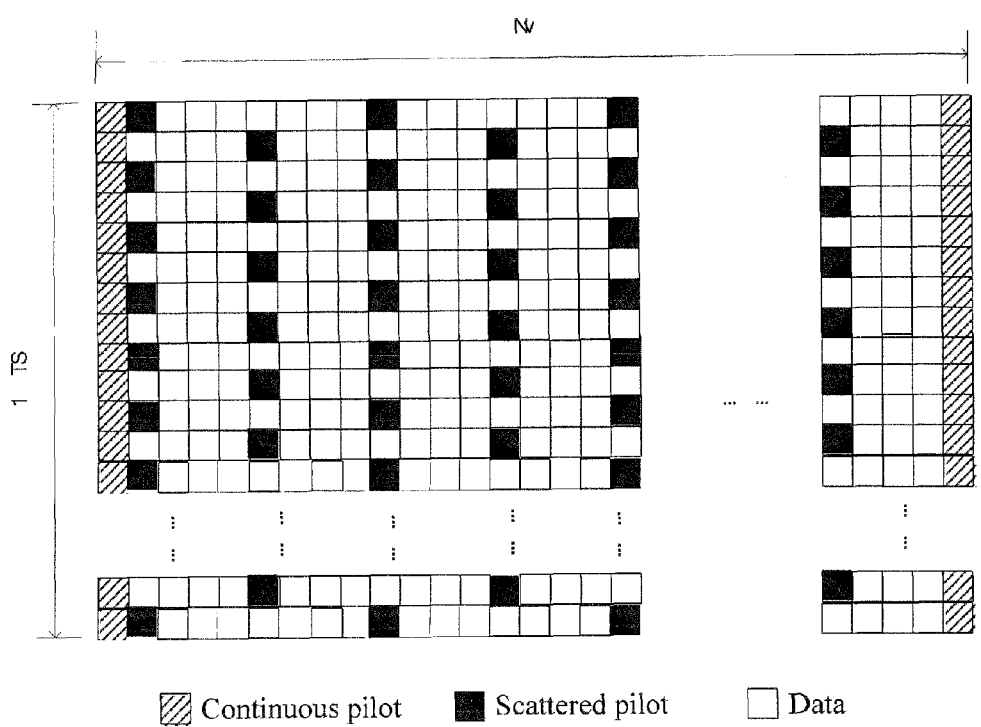
FIG. 1 illustrates the distribution of the scattered pilot signals according to the GY/T220.1-2006 standard.

FIG. 1 shows the distribution of the scattered pilot signals according to the GY/T220.1-2006 standard. The scattered pilots transmit known symbols. The valid sub-carrier serial number m corresponding to the scattered pilot in the $n^{th}$ OFDM symbol in each time slot is expressed as follows ($B_f$ indicates the bandwidth of the physical layer): when $B_f=8$ Mhz:

$$\text{if } \mod(n, 2) == 0$$
$$m = \begin{cases} 8p+1, p = 0, 1, 2, \ldots 191 \\ 8p+3, p = 192, 193, 194, \ldots 383 \end{cases}$$
$$\text{if } \mod(n, 2) == 1$$
$$m = \begin{cases} 8p+5, p = 0, 1, 2, \ldots 191 \\ 8p+7, p = 192, 193, 194, \ldots 383 \end{cases}$$

when $B_f = 2$ Mhz:

$$\text{if } \mod(n, 2) == 0$$
$$m = \begin{cases} 8p+1, p = 0, 1, 2, \ldots 38 \\ 8p+3, p = 39, 40, 41, \ldots 77 \end{cases}$$
$$\text{if } \mod(n, 2) == 1$$
$$m = \begin{cases} 8p+5, p = 0, 1, 2, \ldots 38 \\ 8p+7, p = 39, 40, 41, \ldots 77 \end{cases}$$

The interval pattern provided in the GY/T 220.1-2006 standard for scattered pilot signals and the method for transmitting the scattered pilot signals designed based on this interval pattern are disadvantageous to the channel estimation of a channel with large delay spread and may further impair the receiving performance of the system.

In an embodiment of the present invention, a new pattern of scattered pilots is provided to deal with long echo environment. The transmitter in the system transmits scattered pilots on the sub-carriers of each OFDM symbols. In a time slot, each 4 OFDM symbols is put into a group and the scattered pilots in a group are arranged in the interleave pattern. In an embodiment of the present invention, a method for transmitting scattered pilots is provided. The number of scattered pilots is not changed in the solution according to the embodiment of the present invention, and the inserting pattern of the scattered pilots is changed to deal with long echo environment.

An embodiment of the present invention is disclosed with reference to the attached drawings.

Figure 2:
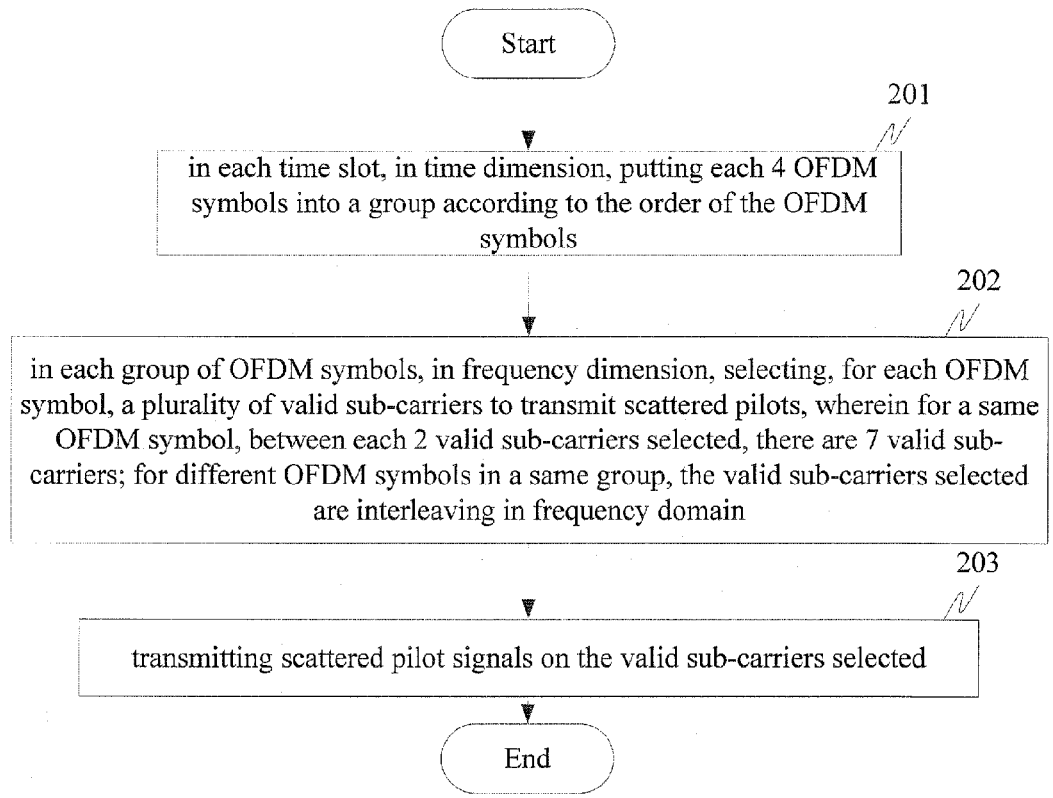
FIG. 2 illustrates a flow chart for transmitting the scattered pilot signals according to an embodiment of the present invention.

FIG. 2 illustrates a flow chart for transmitting the scattered pilots according to an embodiment of the present invention. The method is as follows.

Step 201: In each time slot, in time dimension, putting each 4 OFDM symbols into a group according to the order of the OFDM symbols.

Step 202: In each group of OFDM symbols, in frequency dimension, selecting, for each OFDM symbol, a plurality of valid sub-carriers to transmit scattered pilots, wherein for a same OFDM symbol, between every 2 valid sub-carriers selected, there are 7 valid sub-carriers; and for different OFDM symbols in a same group, the valid sub-carriers selected are interleaving in the frequency domain.

Step 203: transmitting pilots on the valid sub-carriers selected.

Figure 3:
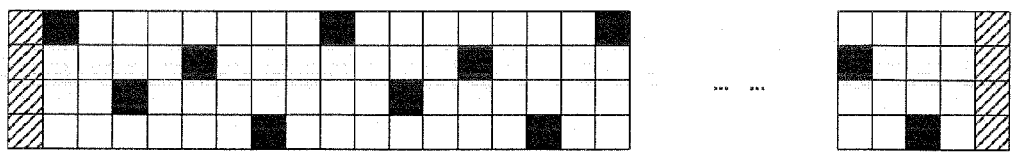
FIG. 3 illustrates the distribution of the scattered pilot signals according to an embodiment of the present invention.
Figure 3:
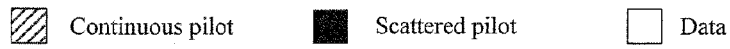

FIG. 3 illustrates the distribution of the scattered pilots according to an embodiment the present invention. In FIG. 3, the distribution of the scattered pilots of a group of OFDM symbols, the group includes 4 OFDM symbols. The scattered pilots shown in FIG. 3 are transmitted on the valid sub-carriers selected. For a same OFDM symbol, there are 7 valid sub-carriers between every 2 valid sub-carriers selected; for different OFDM symbols in a same group, the valid sub-carriers selected are interleaving in the frequency domain. In a time slot, 4 OFDM symbols are orderly arranged in a group, as shown in FIG. 3.

The scattered pilots transmit known symbols. Using n to indicate the serial number of an OFDM symbol in a time slot, and using m to indicate the frequency domain serial number of a valid sub-carrier selected to transmit scatted pilots, the distribution pattern of the valid sub-carrier serial number m corresponding to the scattered pilot in the $n^{th}$ OFDM symbol in each time slot can be expressed with Equations (1) and (2), which deal with 8 MHz mode and 2 MHz mode respectively. The value of n should be determined first before the calculation.

When $B_f=8$ Mhz:

$$\text{if } \mod(n, 4) == 0 \quad (1)$$
$$m = \begin{cases} 8p+1, p = 0, 1, \ldots 191 \\ 8p+3, p = 192, 193, \ldots 383 \end{cases}$$
$$\text{if } \mod(n, 4) == 1$$
$$m = \begin{cases} 8p+5, p = 0, 1, \ldots 191 \\ 8p+7, p = 192, 193, \ldots 383 \end{cases}$$
$$\text{if } \mod(n, 4) == 2$$
$$m = \begin{cases} 8p+3, p = 0, 1, \ldots 191 \\ 8p+5, p = 192, 193, \ldots 383 \end{cases}$$
$$\text{if } \mod(n, 4) == 3$$
$$m = \begin{cases} 8p+7, p = 0, 1, \ldots 191 \\ 8p+9, p = 192, 193, \ldots 383 \end{cases}$$

When $B_f=2$ Mhz:

$$\text{if } \mod(n, 4) == 0 \quad (2)$$
$$m = \begin{cases} 8p+1, p = 0, 1, \ldots 38 \\ 8p+3, p = 39, 40, \ldots 77 \end{cases}$$
$$\text{if } \mod(n, 4) == 1$$
$$m = \begin{cases} 8p+5, p = 0, 1, \ldots 38 \\ 8p+7, p = 39, 40, \ldots 7 \end{cases}$$
$$\text{if } \mod(n, 4) == 2$$
$$m = \begin{cases} 8p+3, p = 0, 1, \ldots 38 \\ 8p+5, p = 39, 40, \ldots 77 \end{cases}$$
$$\text{if } \mod(n, 4) == 3$$
$$m = \begin{cases} 8p+7, p = 0, 1, \ldots 38 \\ 8p+9, p = 39, 40, \ldots 77 \end{cases}$$

Any combination of the four equations corresponding to one same mode can be adopted for the 4 OFDM symbols in a group.

The method for transmitting scattered pilots disclosed by the embodiment of the present invention optimizes the transmission of the scattered pilots by altering the transmission pattern of the scattered pilots without changing the number of the scattered pilots transmitted in a time slot. The method for transmitting scattered pilots in multi-carrier system disclosed by the embodiment of the present invention helps the system to handle multi-path channel with large delay spread, to obtain more accurate channel estimation and to achieve better receiving performance.

The method disclosed by the embodiment can be performed by the use of a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The embodiments disclosed herein are not for use in limiting the present invention. Any equivalent alteration and modification made by those skilled in the field to the technical features of the present invention should be included in the protection scope of the present invention.

What is claimed is:

1. A method for transmitting scattered pilot signals in a multi-carrier system, comprising:
   (a) in each time slot, in time dimension, putting each four OFDM symbols into a group according to an order of the OFDM symbols;
   (b) in each group of OFDM symbols, in frequency dimension, selecting, for each OFDM symbol, a plurality of valid sub-carriers to transmit scattered pilots, wherein for a same OFDM symbol, between each two valid sub-carriers selected, there are seven valid sub-carriers; for different OFDM symbols in a same group, the valid sub-carriers selected are interleaving in frequency domain; and
   (c) transmitting scattered pilot signals on the valid sub-carriers selected;
   wherein if the bandwidth of the physical layer in the multi-carrier system is 8 MHz; step (b) comprises:
   (b1) determining the serial number n of an OFDM symbol for transmitting scattered pilot signals in a time slot;

$$(b2) \text{ if } \mathrm{mod}(n, 4) == 0, m = \begin{cases} 8p+1, p = 0, 1, \ldots 191 \\ 8p+3, p = 192, 193, \ldots 383; \end{cases}$$

$$\text{if } \mathrm{mod}(n, 4) == 1, m = \begin{cases} 8p+5, p = 0, 1, \ldots 191 \\ 8p+7, p = 192, 193, \ldots 383; \end{cases}$$

$$\text{if } \mathrm{mod}(n, 4) == 2, m = \begin{cases} 8p+3, p = 0, 1, \ldots 191 \\ 8p+5, p = 192, 193, \ldots 383; \end{cases}$$

$$\text{if } \mathrm{mod}(n, 4) == 3, m = \begin{cases} 8p+7, p = 0, 1, \ldots 191 \\ 8p+9, p = 192, 193, \ldots 383; \end{cases}$$

wherein m indicates the frequency domain serial number of the valid sub-carriers selected to transmit scattered pilots.

2. A method for transmitting scattered pilot signals in a multi-carrier system, comprising:
   (a) in each time slot, in time dimension, putting each four OFDM symbols into a group according to an order of the OFDM symbols;
   (b) in each group of OFDM symbols, in frequency dimension, selecting, for each OFDM symbol, a plurality of valid sub-carriers to transmit scattered pilots, wherein for a same OFDM symbol, between each two valid sub-carriers selected, there are seven valid sub-carriers; for different OFDM symbols in a same group, the valid sub-carriers selected are interleaving in frequency domain; and
   (c) transmitting scattered pilot signals on the valid sub-carriers selected;
   wherein if the bandwidth of the physical layer in the multi-carrier system is 2 MHz, step (b) comprises:
   (b1) determining the serial number n of an OFDM symbol for transmitting the scattered pilot signals in a time slot;

$$(b2) \text{ if } \mathrm{mod}(n, 4) == 0, m = \begin{cases} 8p+1, p = 0, 1, \ldots 38 \\ 8p+3, p = 39, 40, \ldots 77; \end{cases}$$

$$\text{if } \mathrm{mod}(n, 4) == 1, m = \begin{cases} 8p+5, p = 0, 1, \ldots 38 \\ 8p+7, p = 39, 40, \ldots 77; \end{cases}$$

$$\text{if } \mathrm{mod}(n, 4) == 2, m = \begin{cases} 8p+3, p = 0, 1, \ldots 38 \\ 8p+5, p = 39, 40, \ldots 77; \end{cases}$$

$$\text{if } \mathrm{mod}(n, 4) == 3, m = \begin{cases} 8p+7, p = 0, 1, \ldots 38 \\ 8p+9, p = 39, 40, \ldots 77; \end{cases}$$

wherein m indicates the frequency domain serial number of the valid sub-carriers selected to transmit the scattered pilot signals.

\* \* \* \* \*